(12) United States Patent
Yamazaki

(10) Patent No.: US 9,137,410 B2
(45) Date of Patent: Sep. 15, 2015

(54) INFORMATION PROCESSING APPARATUS, METHOD AND PROGRAM FOR CONTROLLING COVER SHEET AND DOCUMENT DATA TRANSMISSION IN REFERENCE WITH HISTORICAL DATA

(71) Applicant: CANON KABUSHIKI KAISHA, Tokyo (JP)

(72) Inventor: Daisuke Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/521,132

(22) Filed: Oct. 22, 2014

(65) Prior Publication Data
US 2015/0116785 A1  Apr. 30, 2015

(30) Foreign Application Priority Data
Oct. 25, 2013 (JP) .................................. 2013-221948

(51) Int. Cl.
 H04N 1/00 (2006.01)
 H04L 29/06 (2006.01)
 H04N 1/32 (2006.01)

(52) U.S. Cl.
 CPC .............. *H04N 1/0097* (2013.01); *H04L 67/42* (2013.01); *H04N 1/00122* (2013.01); *H04N 1/32085* (2013.01); *H04N 1/32096* (2013.01); *H04N 2201/0093* (2013.01)

(58) Field of Classification Search
 None
 See application file for complete search history.

(56) References Cited

U.S. PATENT DOCUMENTS 5,552,901 A * 9/1996 Kikuchi et al. ............... 358/468
7,265,853 B1 * 9/2007 Kara et al. .................... 358/1.15
8,275,100 B2 * 9/2012 Henry et al. ............. 379/100.13

FOREIGN PATENT DOCUMENTS

JP  H11-237998 A  8/1999

* cited by examiner

*Primary Examiner* — Steven Kau
(74) *Attorney, Agent, or Firm* — Canon U.S.A., Inc. IP Division

(57) ABSTRACT

An information processing apparatus stores historical data including cover data and document data having been transmitted, in a storage unit and manages the historical data. In a case where cover setting information is set for retransmitting the stored historical data including the cover data and the document data, if it is determined that the cover data included in the historical data is usable based on the historical data and the cover setting information having been set for the retransmission, the information processing apparatus invalidates the cover setting information having been set for the retransmission and instructs retransmitting the historical data. According to the retransmission instruction, the cover setting information having been set for the retransmission is invalidated and transmission processing is performed using the historical data.

8 Claims, 14 Drawing Sheets

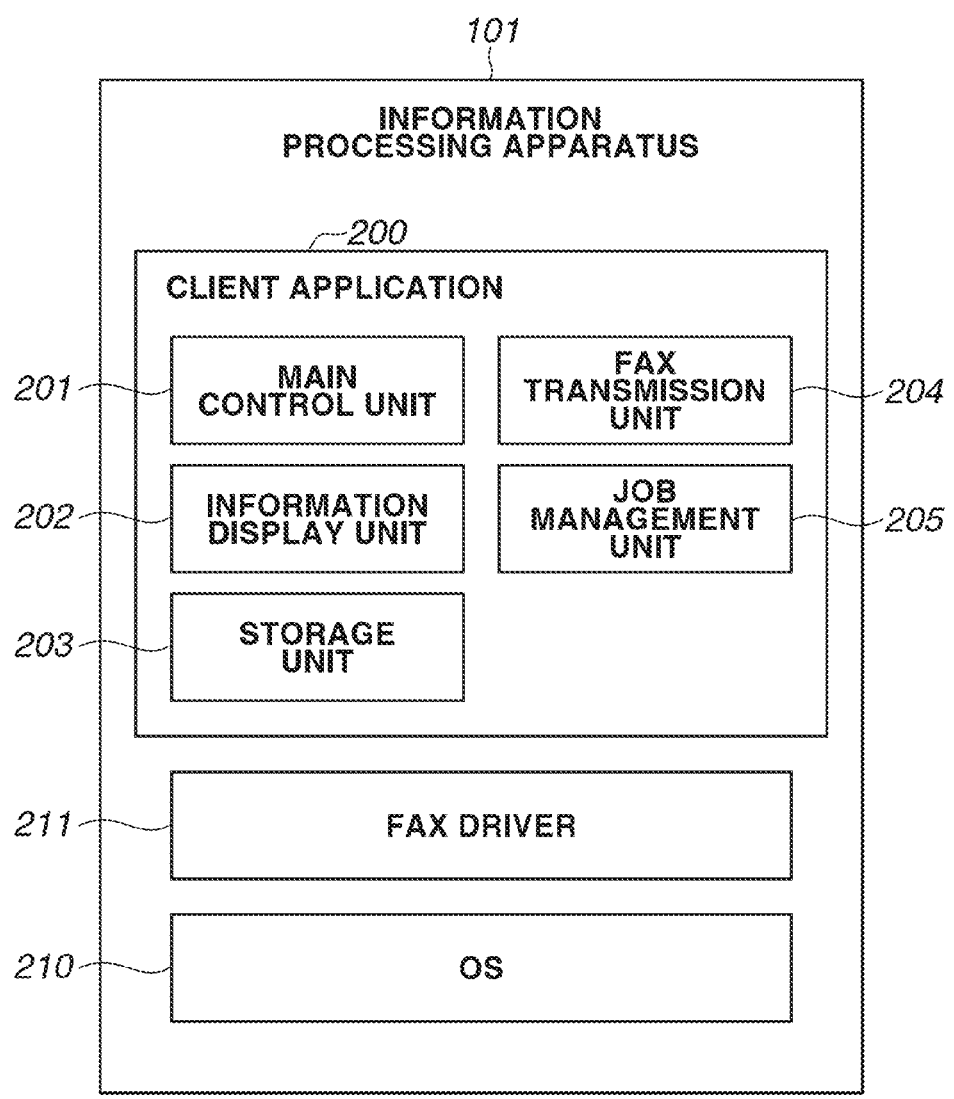

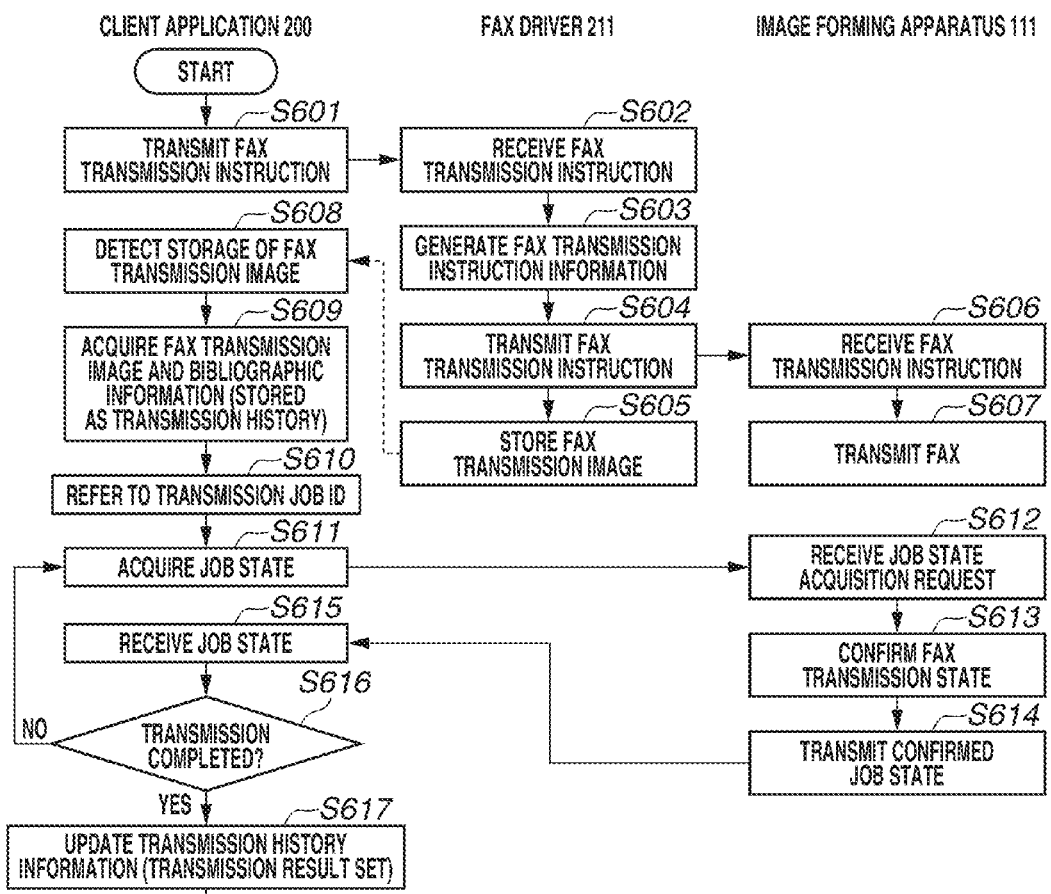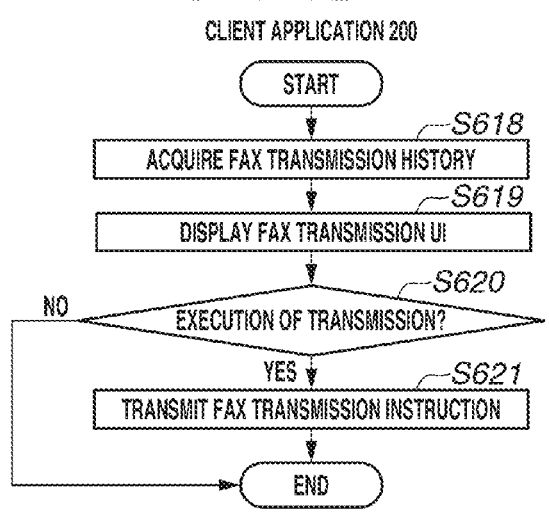

FIG.8

801 — COVER SHEET SETTINGS [×]

802 — ATTACHMENT OF COVER SHEET: [PREPARE UNIQUE SHEET FOR EACH ADDRESS ▼]

803 — SELECTION OF COVER SHEET: [TEMPLATE 1 ▼]

804 — SUBJECT: [ISSUE OF ×××]

805 — COMMENT:
[I am enclosing a document titled "issue of XXX."
Please check the contents.]

806 — ☑ DESCRIBE SENDER NAME
SENDER NAME: [John Smith]

807 — ☐ DESCRIBE FAX NUMBER OF TRANSMISSION SOURCE
FAX NUMBER: [00-0000-0000]

808 — ☑ DESCRIBE ADDRESS NAME
809 — ☑ ADD FAX NUMBER OF DESTINATION

810 — ☑ ADD LOGO
FILE: [C:/MyDocuments/Logo.bmp]

811 — ☑ ADD SIGNATURE
FILE: [C:/MyDocuments/Signature.bmp]

[OK] 812    [CANCEL] 813

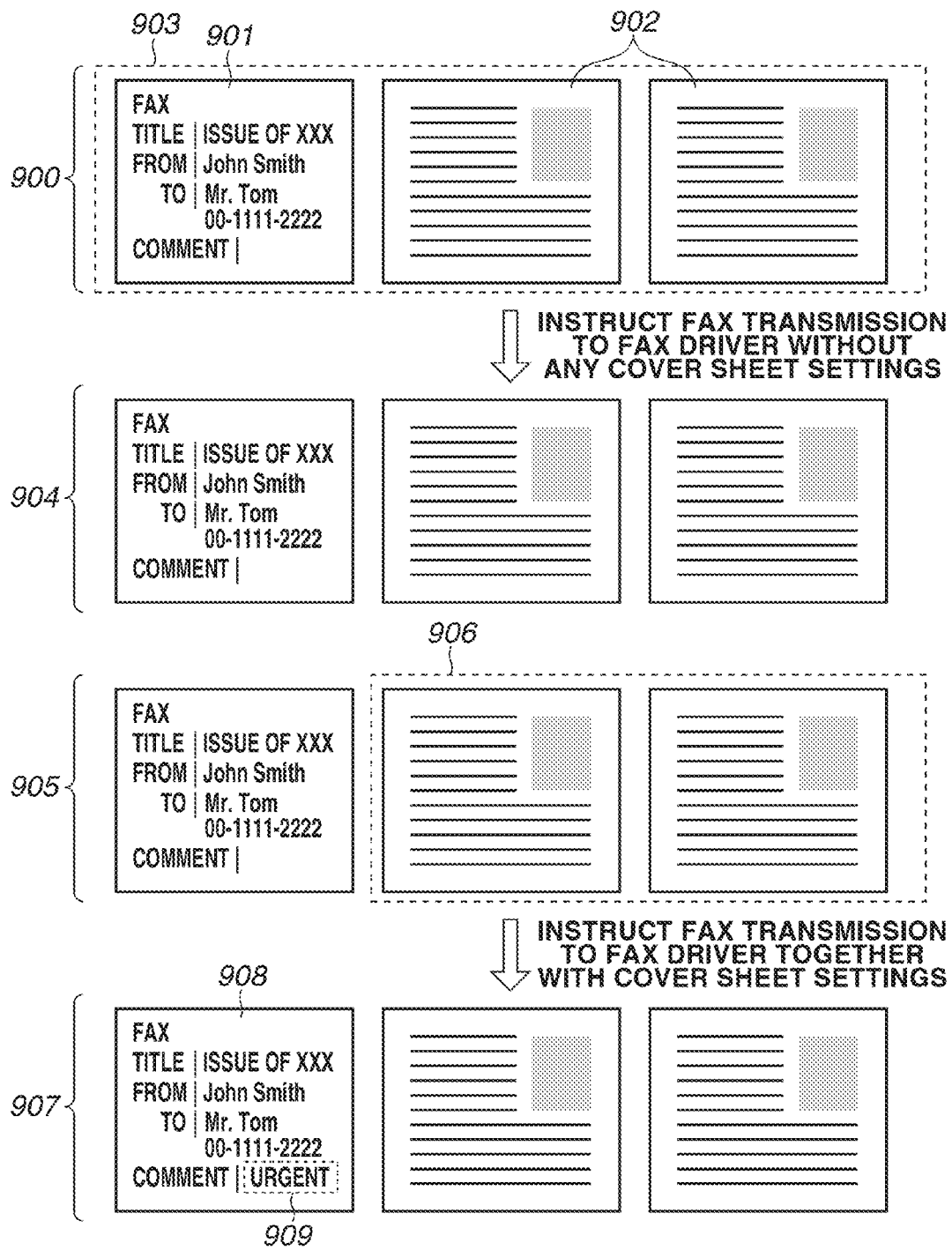

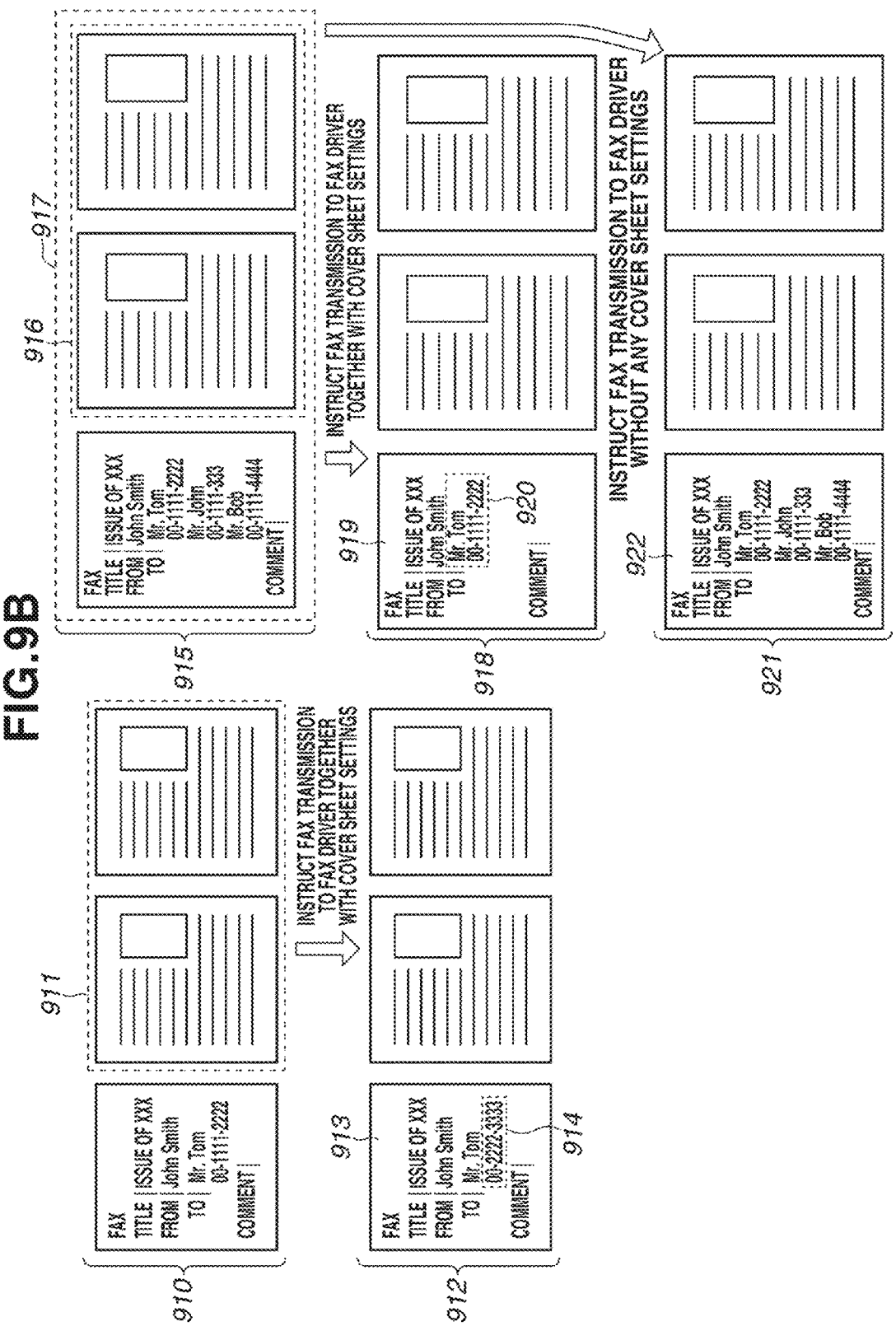

FIG.11

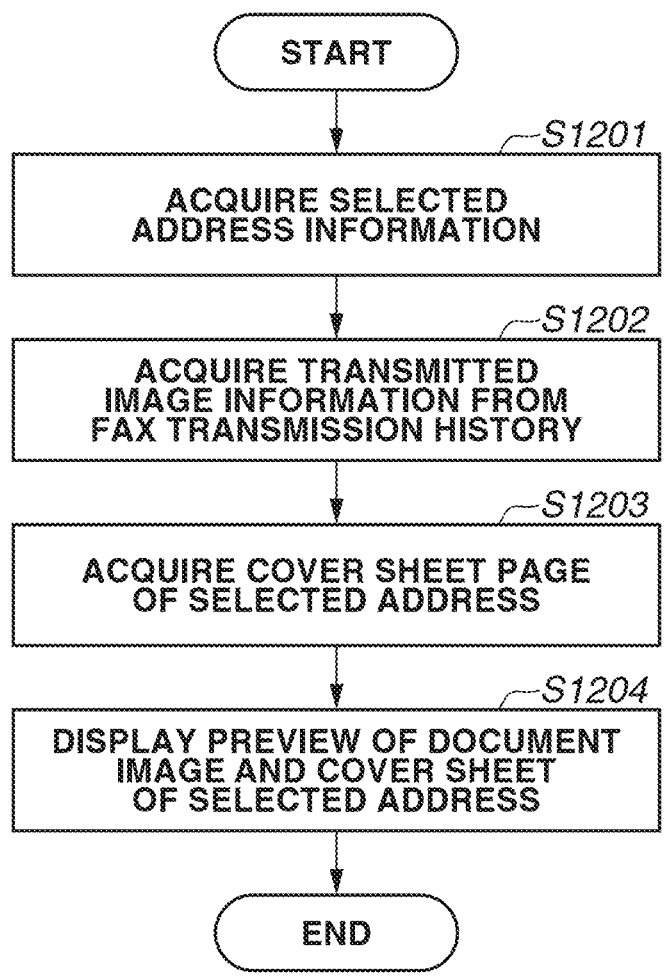

INFORMATION PROCESSING APPARATUS, METHOD AND PROGRAM FOR CONTROLLING COVER SHEET AND DOCUMENT DATA TRANSMISSION IN REFERENCE WITH HISTORICAL DATA

BACKGROUND OF THE INVENTION

1. Field of the Invention

The present invention relates to an information processing apparatus, an information processing apparatus control method, and a program.

2. Description of the Related Art

An information processing apparatus can be used to perform data processing in a FAX transmission work or any other work for business. In such a case, it may be necessary to retransmit FAX data if the transmission processing has failed or a resending request is received from the other party. As discussed in Japanese Patent Application Laid-Open No. 11-237998, it is conventionally known to perform retransmission processing if the FAX transmission has failed.

In the FAX transmission, a cover sheet is occasionally attached to a FAX document to be transmitted. The cover sheet is a cover page or an invoice on which sender information (e.g., name and address) is described. However, according to the prior art discussed in Japanese Patent Application Laid-Open No. 11-237998, nothing about the cover sheet is taken into consideration and therefore a cover sheet not intended by a user may be erroneously output.

SUMMARY OF THE INVENTION

According to an aspect of the present invention, an information processing apparatus includes a transmission unit configured to transmit cover data and document data to a designated transmission destination, a storage unit configured to store historical data including the cover data and the document data transmitted by the transmission unit, a setting unit configured to set cover setting information for retransmitting the historical data including the cover data and the document data, a determination unit configured to determine whether the cover data included in the historical data is usable based on the historical data and the cover setting information having been set for the retransmission, and an instruction unit configured to invalidate the cover setting information having been set by the setting unit for the retransmission if it is determined that the cover data included in the historical data is usable and instruct retransmitting the historical data.

Further features of the present invention will become apparent from the following description of exemplary embodiments with reference to the attached drawings.

BRIEF DESCRIPTION OF THE DRAWINGS

FIG. 2 illustrates a software configuration of the information processing apparatus.

FIGS. 6A and 6B are flowcharts illustrating data processing that can be performed by the information processing system.

FIG. 8 illustrates a cover sheet setting UI of the client application.

FIG. 9A illustrates FAX transmission processing that can be performed by the information processing apparatus.

FIG. 9B illustrates FAX transmission processing that can be performed by the information processing apparatus.

FIG. 11 illustrates an example of a UI screen displayed by the display unit.

FIG. 12 is a flowchart illustrating a method for controlling the information processing apparatus.

DESCRIPTION OF THE EMBODIMENTS

Various exemplary embodiments, features, and aspects of the invention will be described in detail below with reference to the drawings.

Description of the flowing exemplary embodiments is not intended to narrowly limit the scope of the present invention. Further, the entire configuration described in each exemplary embodiment is not always necessary to constitute modules of the present invention that are required to solve the above-mentioned problem.

System Configuration and Hardware Configuration

Figure 1A:
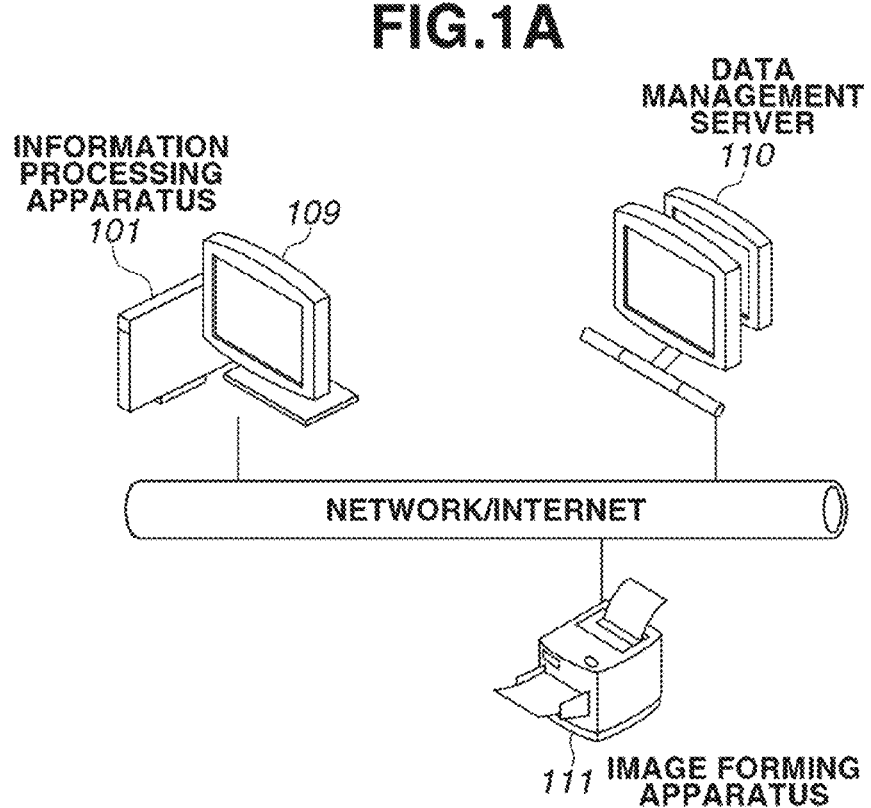
FIGS. 1A and 1B illustrate a configuration of an information processing system that includes an information processing apparatus.
Figure 1B:
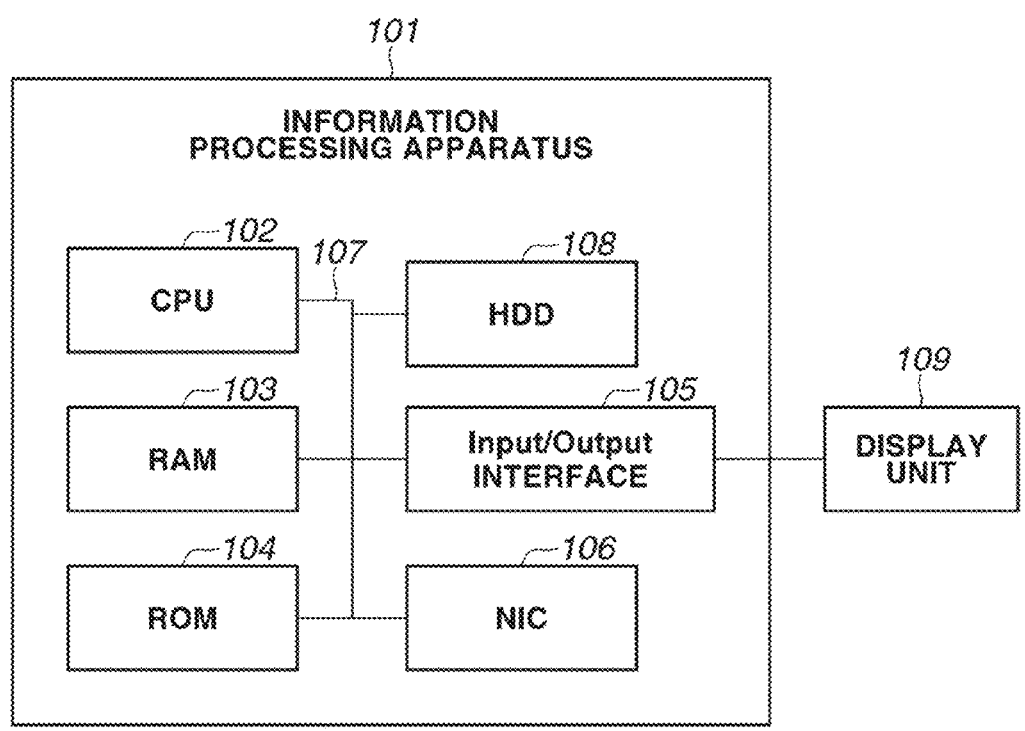

FIGS. 1A and 1B illustrate a configuration of an information processing system that includes an information processing apparatus according to a first exemplary embodiment. FIG. 1A illustrates a system configuration of the information processing system. FIG. 1B is a block diagram of an image forming apparatus illustrated in FIG. 1A. In FIG. 1A, an information processing apparatus (e.g., a computer) 101 is connected to a network and is further connected to the internet via the network. A data management server 110 and an image forming apparatus 111 are connected to the network/internet. Further, although only one information processing apparatus 101 is provided in the present exemplary embodiment, the information processing system can be configured to include a plurality of information processing apparatuses.

For example, the network/internet is a wired or wireless communication line network that can support TCP/IP protocols. Further, the information processing apparatus 101 includes various constituent units 102 to 107. In the present exemplary embodiment, the image forming apparatus 111, the data management server 110, and the information processing apparatus 101 can be configured similarly.

In FIG. 1B, the functional unit 102 is a central processing unit (CPU) that can execute various programs and can realize various functions according to the programs. The functional unit 104 is a read only memory (ROM) that can store various programs and data. The functional unit 103 is a random access memory (RAM) that can store various types of information. Further, the RAM 103 can serve as a temporary work storage area for the CPU 102. For example, the CPU 102 can execute each program when it is loaded into the RAM 103 together with related data from the ROM 104.

Each flowchart illustrates processing that can be performed by the information processing apparatus. The CPU 102 reads a program related to the flowchart from the memory and executes the read program. The functional unit 105 is an input/output interface that can transmit various data to a display device (not illustrated) connected to the information processing apparatus 101 and can receive various data from a pointing device (not illustrated). The functional unit 106 is a network interface card (NIC) that can connect the information processing apparatus 101 to the network. The above-mentioned functional units are configured to transmit and receive various data via a bus 107.

Further, the image forming apparatus 111 includes a FAX unit (not illustrated) that can transmit and receive various data to each unit via a bus (not illustrated). The FAX unit can receive facsimile control language data from the information processing apparatus 101 and can rasterize the received language data into an image. The FAX unit can transfer the obtained image to another facsimile apparatus or an IP-FAX via a public telephone line (not illustrated) or the internet. Further, the image forming apparatus 111 includes a printing unit (not illustrated) and a scanner unit (not illustrated). The printing unit is capable of printing a raster image on a recording medium. Further, the scanner unit is capable of performing an image input operation.

(Overall) Software Configuration

FIG. 2 illustrates a software configuration of the information processing apparatus 101 illustrated in FIGS. 1A and 1B. In FIG. 2, a program that can realize various functions of a client application 200 is stored in the ROM 104 of the information processing apparatus 101. More specifically, the CPU 102 can execute a program loaded into the RAM 103 to realize the functions of the apparatus and the processing of the flowcharts described below. The whole or a part of the functions of the apparatus and the processing relating to the flowcharts described below can be realized by a dedicated hardware. An operating system (OS) 210 can provide generally known OS functions (e.g., memory management, resource management, and application management).

The information processing apparatus 101 includes a FAX driver 211, as one of software programs installed on the OS 210. The FAX driver 211 opens, as a software development kit (SDK) of the FAX driver 211, an IF that enables the client application 200 to control the functions of the FAX driver 211. The SDK assures a cooperative operation between the FAX driver 211 and the client application 200. The cooperative operation is, for example, mutually providing functions of the FAX driver 211 and the client application 200 to perform processing through transmission/reception of data and commands.

The client application 200 can perform controls for the FAX driver 211 via the IF. Further, the client application 200 can use the functions of the FAX driver 211 via the OS 210. The FAX driver 211 can perform processing according to an instruction from the client application 200 via the SDK or the OS 210. If the FAX driver 211 accepts a FAX transmission instruction from the client application 200, the FAX driver 211 converts a document file designated by an output instruction into data having a format dedicated to facsimile transmission (e.g., raster data) that can be interpreted by the image processing apparatus 111. Then, the converted document file is transmitted to the image processing apparatus 111 via the network 103.

A software configuration of the client application 200 is described in detail below. The client application 200 includes various modules 201 to 205 as described below. The first module 201 is a main control unit that is configured to control the client application 200 and can perform instruction and management processing for each module unit. The second module 202 is an information display unit that is configured to provide UI screens of the client application 200 to a user according to an instruction from the main control unit 201. The third module 203 is a storage unit that is configured to store and manage various data of the client application 200.

The fourth module 204 is a FAX transmission unit that is configured to instruct the FAX driver 211 to perform FAX transmission processing. More specifically, the FAX transmission unit 204 can perform processing for transmitting cover data and document data (text data) to a designated transmission destination according to a flowchart described below. The job management unit 205 acquires an image file of a FAX transmission image and bibliographic information from the FAX driver 211. Further, the job management unit 205 acquires the state of a FAX transmission job of the image forming apparatus 111.

Figure 3:
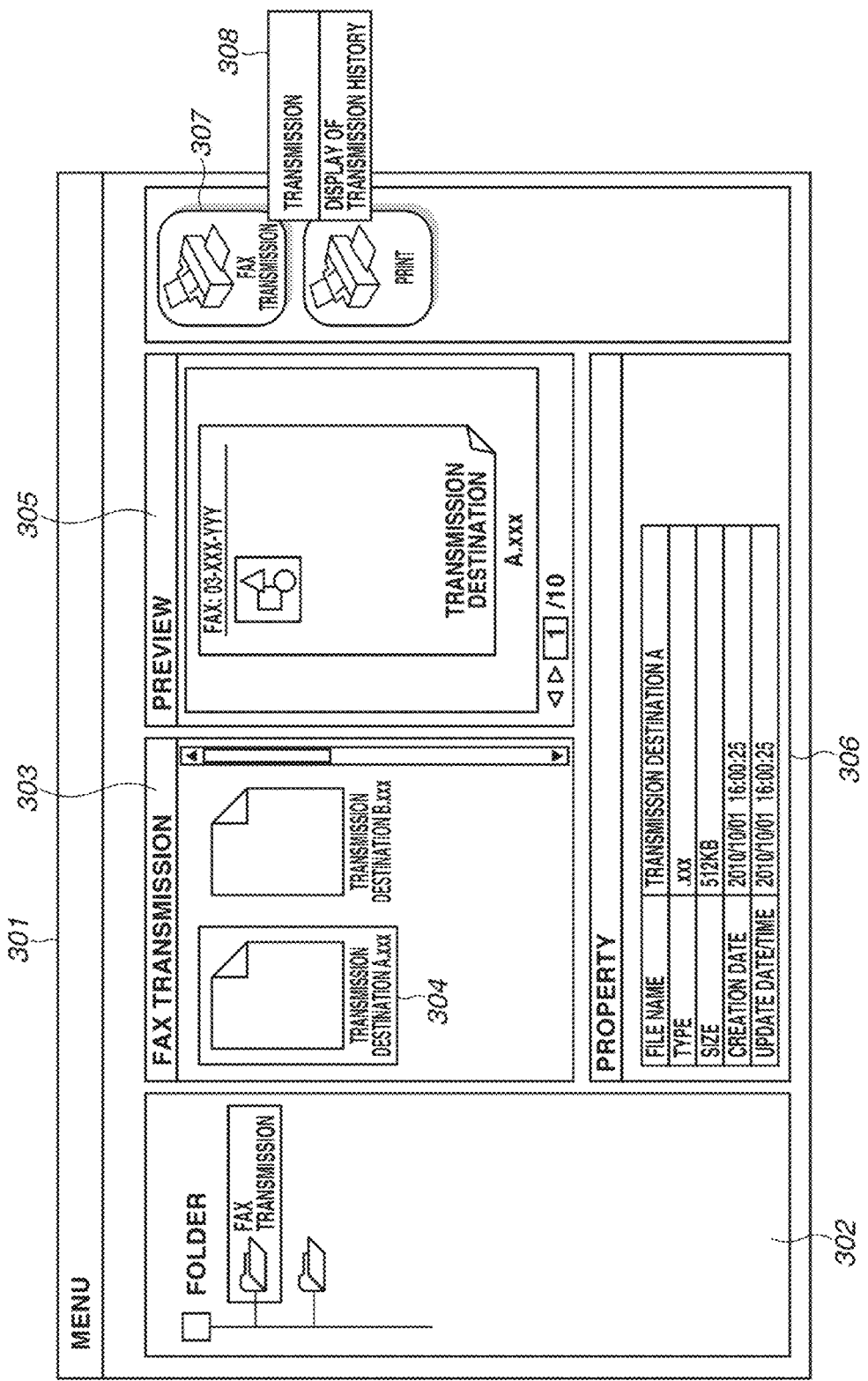
FIG. 3 illustrates a UI screen of a client application illustrated in FIG. 2.

FIG. 3 illustrates a UI screen of the client application 200 illustrated in FIG. 2. In FIG. 3, a main UI 301 includes a folder tree view 302 that indicates a folder hierarchical structure of files to be managed and a file view 303 that displays a file in the folder.

In FIG. 3, the folder tree view 302 includes a FAX transmission dedicated folder, which is currently selected by a user. A file of the currently selected folder is displayed in the file view 303. According to the example of the file view 303 illustrated in FIG. 3, it is understood that two files (i.e., a transmission destination A.xxx and a transmission destination B.xxx) are present in the FAX transmission dedicated folder. A file 304 corresponds to the file currently selected in the file view 303. The main UI 301 includes a preview 305 in which a preview of the currently selected file 304 can be displayed. The main UI 301 includes file property 306 in which detailed information about the currently selected file 304 can be displayed. The information to be displayed in the file property 306 can be managed by the client application 200. Items to be displayed in the file property 306 includes, for example, file name, type, file size, creation date, and update date/time.

A FAX transmission button 307 is one of functions that can be provided by the client application 200. In a state where a file is selected in the file view 303, if the FAX transmission button 307 is pressed, FAX transmission processing for the selected file can be performed. Alternatively, if a file is moved to the FAX transmission button 307 by a drag-and-drop operation, FAX transmission processing for the moved file can be performed.

In FIG. 3, if the FAX transmission button 307 is pressed in a state where the file 304 is currently selected, FAX transmission processing for the selected file 304 can be started. A context menu 308 can be displayed when a mouse cursor is positioned on the FAX transmission button 307. In the present exemplary embodiment, the context menu 308 of the FAX transmission button 307 includes two options of "FAX transmission" and "display of transmission history."

Figure 4:
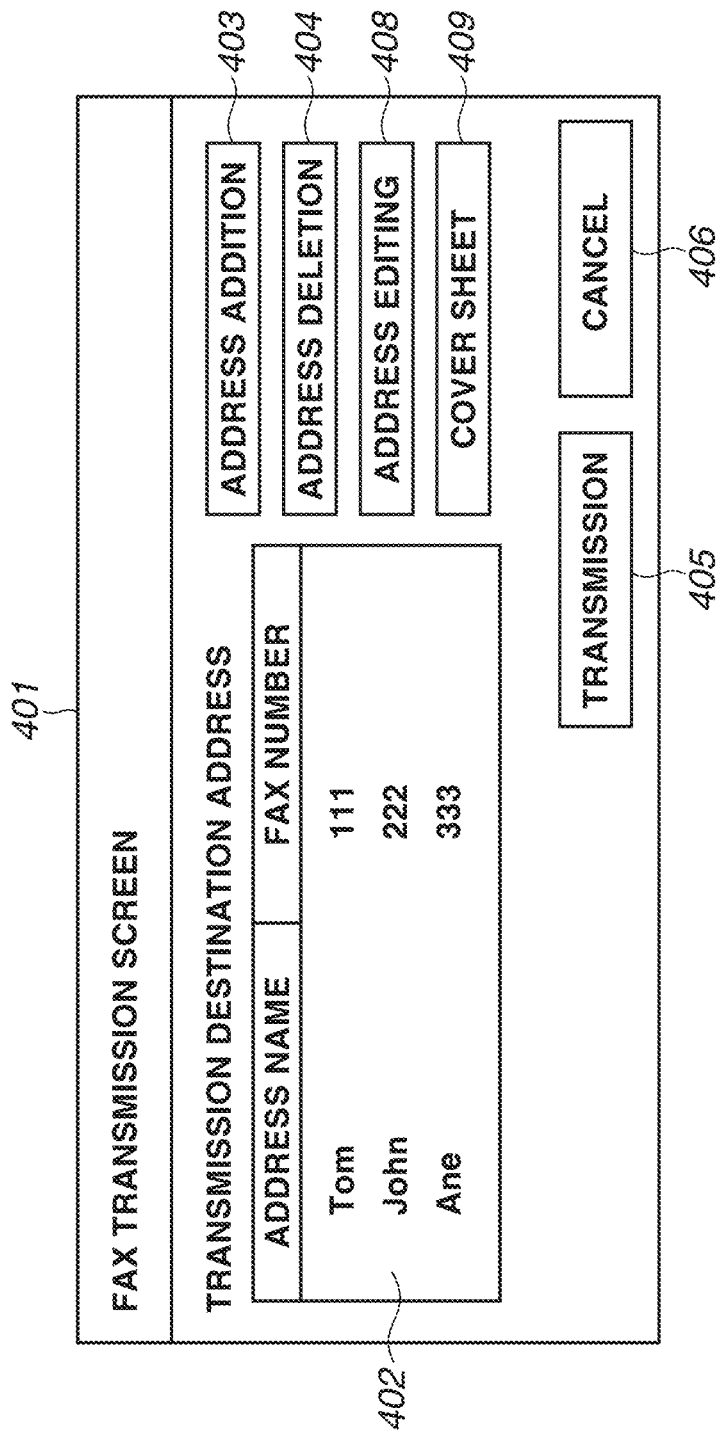
FIG. 4 illustrates a UI screen of the client application illustrated in FIG. 2.

FIG. 4 illustrates a FAX transmission screen of the client application 200 illustrated in FIG. 2. The screen illustrated in FIG. 4 can be displayed when a file is dropped on the FAX transmission button 307 or when the option "FAX transmission" is selected on the context menu 308. Further, the FAX transmission screen illustrated in FIG. 4 can be displayed in a FAX transmission processing flow described below. A FAX transmission screen 401 illustrated in FIG. 4 is an example of the UI that can be displayed before the FAX transmission processing for the selected file 304 is started.

The FAX transmission screen 401 includes a transmission destination address 402. The transmission destination address 402 is information includes setting values usable in the FAX transmission processing. For example, an address name and a FAX transmission destination number can be displayed as the transmission destination address 402. Although not illustrated in the present exemplary embodiment, a FAX line type can be displayed in the transmission destination address 402. When a user designates a multi-destination transmission to send the same file to a plurality of addresses, the user can add a plurality of addresses to the transmission destination address 402. An address addition button 403 is a button operable to newly add a FAX transmission destination address to the transmission destination address 402.

If a user presses the address addition button 403, an address addition screen (not illustrated) can be displayed to enable the user to edit the transmission destination address information added to the transmission destination address 402. An address deletion button 404 is a button operable to delete a designated address from the transmission destination address 402. A FAX transmission button 405 is a button operable to perform an operation to transmit a FAX document to a designated transmission destination added to the transmission destination address 402. If a user presses the FAX transmission button 405, the FAX transmission processing can be started. The FAX transmission instruction from the client application 200 can be notified to the FAX driver 211 via the OS 210.

A cancel button 406 is a button operable to cancel the above-mentioned FAX transmission processing. If a user presses the cancel button 406, the FAX transmission screen 401 can be closed. An address editing button 408 is a button operable to edit address information added to the transmission destination address 402. If a user presses the address editing button 408, an address editing screen (not illustrated) can be displayed to enable the user to edit transmission destination address information currently selected in the transmission destination address 402. A cover sheet button 409 is a button operable to set a cover sheet. If a user presses the cover sheet button 409, a cover sheet setting UI (described below) can be displayed to enable the user to set a cover sheet to be attached to the FAX document.

Figure 5:
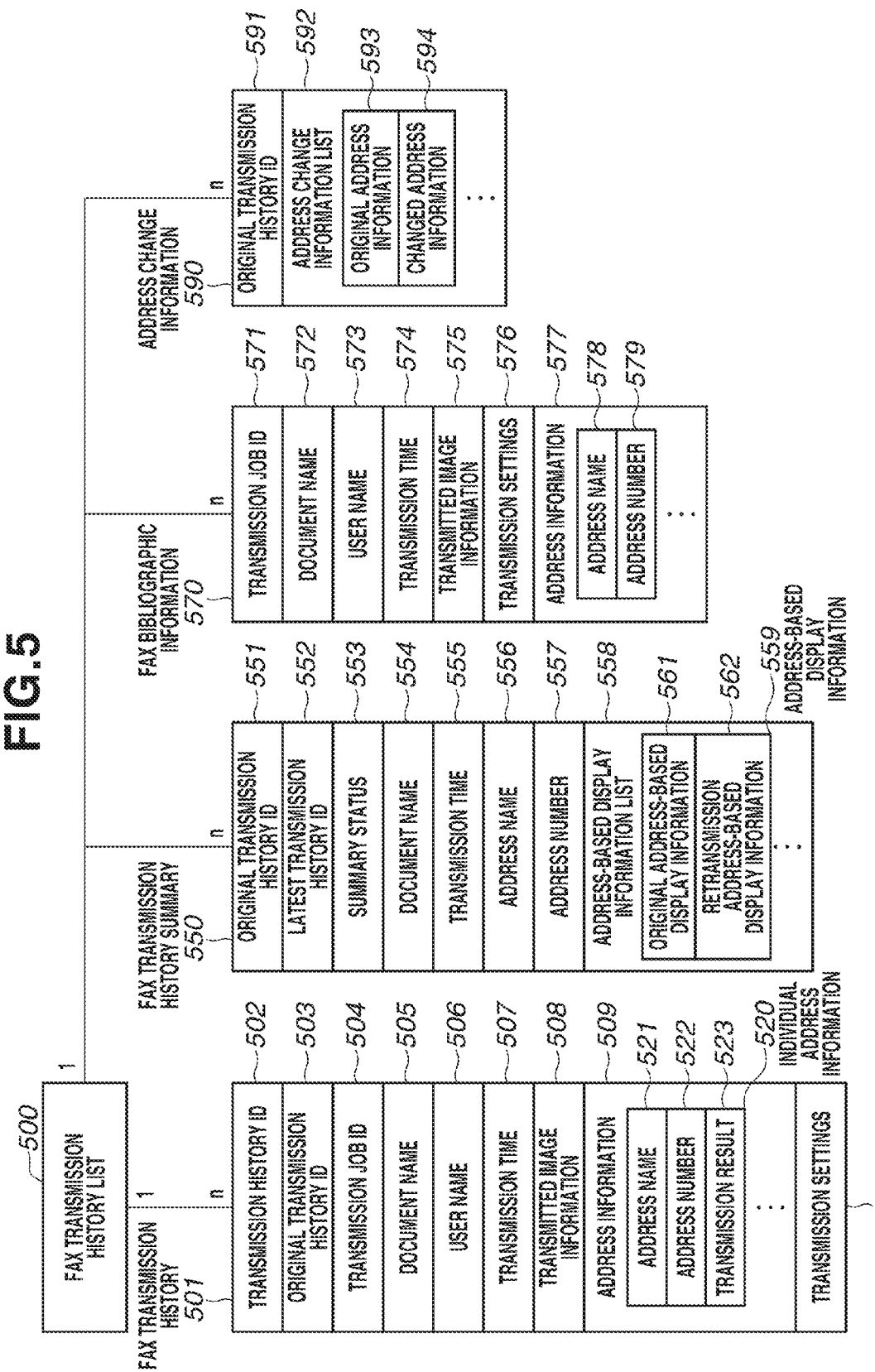
FIG. 5 illustrates FAX transmission historical data stored in the information processing apparatus.

FIG. 5 schematically illustrates a hierarchical structure of FAX transmission historical data stored in the information processing apparatus according to the present exemplary embodiment. In FIG. 5, a FAX transmission history list 500 is constituted by one or a plurality of pieces of FAX transmission history 501, one or a plurality of pieces of FAX transmission history summary 550, one or a plurality of pieces of FAX bibliographic information 570, and one or a plurality of pieces of the address change information 590.

The FAX transmission history list 500 is stored as a file in an external storage device connected to the information processing apparatus 101 or the data management server 110. Further, the FAX transmission history list 500 can be managed in a database of the information processing apparatus 101 or the data management server 110.

The FAX transmission history 501 includes FAX transmission contents and transmission results. More specifically, the FAX transmission history 501 includes transmission history ID 502, original transmission history ID 503, transmission job ID 504, document name 505, user name 506, transmission time 507, transmitted image information 508, address information 509, and transmission settings 510. The transmission history ID 502 is ID information capable of identifying FAX transmission history, which is uniquely allocated to each FAX transmission performed by the user. When a FAX document is retransmitted, transmission history ID of a retransmission source is stored as the original transmission history ID 503.

In the FAX transmission operation, the transmission job ID 504 can be notified to the FAX driver 211. The transmission job ID 504 is ID information capable of associating the FAX bibliographic information 570 generated by the FAX driver 211 with the FAX transmission history 501. The document name 505 is the name of a document subjected to the FAX transmission processing. The user name 506 is the name of a FAX sender. The transmission time 507 is date and time of each FAX transmission. The transmitted image information 508 is information capable of referring to an image subjected to the FAX transmission processing. More specifically, the transmitted image information 508 includes at least a reference file path to the FAX transmission image file.

The address information 509 includes one or a plurality of pieces of individual address information 520. The individual address information 520 includes address name 521, address number 522, and transmission result 523. The address name 521 is the name of each FAX transmission destination. The address number 522 is a FAX number. The transmission result 523 is a transmission result of each FAX document sent to the designated address. The transmission result 523 includes a result (e.g., success or failure) of the transmission. The transmission settings 510 store the settings used in each FAX transmission. For example, information indicating the presence of a cover sheet is included in the transmission settings 510. An address change information list is stored when the address is changed in a FAX retransmission operation to associate the changed address information with the previous (non-changed) address information.

The FAX transmission history summary 550 includes aggregated contents about FAX transmission history having the same original transmission history ID. More specifically, the aggregated contents include FAX transmission history generated by the retransmission and transmission history used in the retransmission. The FAX transmission history summary 550 can be referred to in the display of transmission history summary 700 illustrated in FIG. 7. The FAX transmission history summary 550 can be generated based on the FAX transmission history 501 and the address change information 590. Therefore, the summary data can be stored entirely or partly as a file in the RAM.

The FAX transmission history summary 550 includes original transmission history ID 551, latest transmission history ID 552, summary status 553, document name 554, transmission time 555, address name 556, address number 557, and address-based display information list 558. The transmission history ID of the retransmission source is stored as the original transmission history ID 551.

Transmission history ID of FAX transmission history finally FAX transmitted using FAX transmission history of the retransmission source is stored as the latest transmission history ID 552. The summary status 553 is an aggregated transmission result of FAX transmission history generated by the retransmission and transmission history used in the retransmission.

The document name 554 is identical to the document name 505. The transmission time 555 is transmission time of a FAX document finally transmitted using the FAX transmission history of the retransmission source. The address name 556 is the name of a transmission destination of a FAX document transmitted using the FAX transmission history of the retransmission source. In a case where a plurality of addresses is present, a comment informing the presence of the plurality of addresses is stored in association with the address name 556.

For example, in a case where three addresses are present, the content stored in the address name 556 indicates that there are three addresses. The address number 557 is a FAX number of each FAX transmission destination. In a case where a plurality of addresses is present, the content stored in the address number 557 indicates that there is a plurality of FAX numbers. For example, the content indicating "multi-destination transmission" can be stored in association with the address number 557.

The address-based display information list 558 includes one or a plurality of pieces of address-based display information 559. The address-based display information 559 is constituted by original address-based display information 561 and retransmission address-based display information 562. The original address-based display information 561 is address/display related information about an initially transmitted FAX document. The retransmission address-based display information 562 is address/display related information about one or a plurality of pieces of retransmission operations. At least one of address name, address number, and transmission result is stored as the original address-based display information 561 or the retransmission address-based display information 562. Further, information about transmission time and sending user can be also stored as the original address-based display information 561 or the retransmission address-based display information 562.

The FAX bibliographic information 570 is information relating to FAX transmission contents generated by the FAX driver 211 in the FAX transmission processing. The FAX bibliographic information 570 includes transmission job ID 571, document name 572, user name 573, transmission time 574, transmitted image information 575, transmission settings 576, and address information 577. The transmission job ID 571 is ID information capable of identifying each FAX transmission job. When a transmission job ID is notified by the client application 200, the notified ID is stored as the transmission job ID 571. In a case where no transmission job ID is notified by the client application 200, the FAX driver 211 generates and stores ID information. The document name 572 is the name of a document subjected to the FAX transmission processing.

The user name 573 is the name of each FAX sender. The transmission time 574 is the date/time of each FAX transmission. The transmitted image information 575 is information capable of referring to each FAX transmission image. More specifically, the transmitted image information 575 includes at least a reference file path to the FAX transmission image file. The transmission settings 576 store the settings used in each FAX transmission. For example, information indicating the presence of a cover sheet is included in the transmission settings 576. The address information 577 is constituted by address name 578 and address number 579, which can identify the address used in each FAX transmission.

The address change information 590 relates to contents of a pre-change address and a changed address in a case where the address is changed in a FAX retransmission operation. The address change information 590 includes original transmission history ID 591 and address change information list 592. The transmission history ID of each retransmission source is stored as the original transmission history ID 591. The address change information list 592 includes one or a plurality of pairs of original address information 593 and changed address information 594. The individual address information 520, which serves as a retransmission source of a retransmission operation, is stored as the original address information 593. The individual address information 520 about the FAX transmission history 501 of the retransmission operation is stored as the changed address information 594.

FAX Transmission Flow

FAX transmission processing that can be performed by the client application 200 of the information processing apparatus 101 is described in detail below with reference to FIGS. 6A and 6B. FIGS. 6A and 6B are flowcharts illustrating data processing that can be performed by the information processing apparatus and the image forming apparatus 111 according to the present exemplary embodiment. FIG. 6A is a flowchart relating to sequential processing including FAX transmission to be performed by the client application 200 and acquisition/storage of a transmission result as FAX transmission history to be performed by the image forming apparatus 111. FIG. 6B is a flowchart illustrating processing that can be performed by the client application 200 and the FAX driver 211 illustrated in FIG. 2.

Further, the FAX transmission to be performed by the client application 200 can be started when a user performs a predetermined FAX transmission operation, including selection of a file on the file view 303 and pressing the FAX transmission button 307, as mentioned above. To realize the processing to be performed by the image forming apparatus, the CPU of the image forming apparatus 111 executes a control program relating to the above-mentioned flowcharts when the control program is loaded from the ROM. In this case, the control program includes various modules illustrated in FIG. 2. In the following description, operations to be performed by various modules are described in detail.

If a transmission instruction from a user is accepted, then in step S601, the main control unit 201 transmits a FAX transmission instruction to the FAX driver 211 based on rendering information of the file currently selected on the file view 303 and transmission settings designated via the FAX transmission screen 401.

If in step S602 the FAX driver 211 accepts the FAX transmission instruction transmitted from the client application 200, then in step S603, the FAX driver 211 generates FAX transmission instruction information that is required to cause the image forming apparatus 111 to perform FAX transmission processing. More specifically, the FAX driver 211 converts rendering data of a designated FAX transmission target file into raster data that can be processed by the image forming apparatus 111 (which may be referred to as "FAX transmission image").

Further, the FAX driver 211 converts the designated transmission settings into transmission instruction information that can be interpreted and executed by the image forming apparatus 111. Then, the FAX driver 211 generates the FAX transmission instruction information that includes the FAX transmission image and the transmission instruction information. In step S604, the FAX driver 211 transmits the FAX transmission instruction information generated in step S603 to the image forming apparatus 111 via the network 103.

In step S605, the FAX driver 211 stores the FAX transmission image transmitted to the image forming apparatus 111. More specifically, the FAX driver 211 stores the converted image data as a general image storing format file. The general image storing format is, for example, Tagged Image File Format (TIFF). Further, the FAX driver 211 stores the transmission instruction information as the FAX bibliographic information 570. The FAX driver 211 stores the FAX bibliographic information 570 as a general structured text file. An Extensible Markup Language (XML) file is an example of the general structured text file.

In step S606, the image forming apparatus 111 performs FAX transmission processing based on the FAX transmission instruction information received from the FAX driver 211. More specifically, based on the received FAX transmission instruction information, the image forming apparatus 111 transmits a FAX document to other facsimile apparatus or an IP-FAX via a public telephone line (not illustrated) or the internet.

Next, in step S608, the client application 200 detects the storage of the FAX transmission image performed by the FAX driver 211. The storage detection of the FAX transmission image can be realized when the job management unit 205 of the client application 200 accepts a storage completion notification about the FAX transmission image from the FAX driver 211. Alternatively, the storage detection of the FAX transmission image can be realized by causing the job management unit 205 to monitor the FAX driver 211 that generates a file of a storage destination of the FAX transmission image. When the job management unit 205 detects the storage of the FAX transmission image, the job management unit 205 transmits a notification to the main control unit 201.

In step S609, the main control unit 201 of the client application 200 acquires the FAX transmission image and the FAX bibliographic information detected in step S608. More specifically, the main control unit 201 makes a copy of the files of the FAX transmission image and the FAX bibliographic information 570 to be stored at a predetermined place that can be managed by the client application 200. Further, the main control unit 201 reads the FAX bibliographic information 570 and generates the FAX transmission history 501. The FAX transmission history 501 can be stored in the information processing apparatus 101 or the data management server 110. If the FAX transmission history 501 is stored in the data management server 110, a plurality of users can share the FAX transmission history and can browse or retransmit the history information.

In step S610, the main control unit 201 of the client application 200 refers to the transmission job ID 504 defined in the FAX bibliographic information read in step S609. The transmission job ID 504 is ID information that can uniquely identify a transmission instruction (i.e., a transmission job) executed by the FAX driver 211. The client application 200 can acquire information about the state of a transmission job that coincides with the transmission job ID 504 by sending an inquiry to the image forming apparatus 111.

In step S611, the main control unit 201 of the client application 200 instructs the job management unit 205 to transmit a transmission job state acquisition request to the image forming apparatus 111 while designating the transmission job ID 504 referred to in step S610. If in step S612 the image forming apparatus 111 accepts the transmission job state acquisition request from the client application 200, then in step S613, the image forming apparatus 111 confirms the state of a FAX transmission job that coincides with the designated transmission job ID 504.

For example, the state of the FAX transmission job indicates a state of a transmission job in progress, such as image data rasterizing processing or calling to the other party, or a state of a completed transmission job, such as transmission completion or transmission failure. The image forming apparatus 111 can confirm the state of the transmission job by referring to the processing state of the memory provided in the image forming apparatus 111 or FAX transmission log information stored in an associated HDD. In step S614, the image forming apparatus 111 transmits the state of the transmission job confirmed in step S613 to the information processing apparatus 101 (i.e., the request source).

In step S615, the job management unit 205 of the client application 200 provided in the information processing apparatus 101 receives a response of the job state from the image forming apparatus 111 and notifies the job state to the main control unit 201. Next, in step S616, the main control unit 201 confirms the received job state and determines whether the job state is the completion state (e.g., transmission completion or transmission failure). If it is determined that the job state indicates that the processing is currently in progress (No in step S616), the operation returns to step S611 after a predetermined time has elapsed. The main control unit 201 of the client application 200 requests the image forming apparatus 111 to perform the job state acquisition processing again. If it is determined that the job state is the completion state (Yes in step S616), then in step S617, the main control unit 201 instructs the storage unit 203 to store the completion state as a transmission result in the FAX transmission history 501.

FIG. 6B is a flowchart illustrating FAX transmission history retransmission processing that can be performed by the client application 200. The processing flow illustrated in FIG. 6B can be started when a retransmission target transmission history is selected from the transmission history summary 700 of the client application 200 and retransmission of the selected history is performed.

If a retransmission instruction from a user is accepted, then in step S618, the main control unit 201 of the client application 200 acquires the FAX transmission history 501 currently selected on the transmission history summary 700. More specifically, the main control unit 201 refers to the FAX transmission history 501 via the storage unit 203 and acquires the transmitted image information 508 and the transmission settings 510. If the acquisition of the FAX transmission history 501 completes, then in step S619, the main control unit 201 instructs the information display unit 202 to display the FAX transmission screen 401.

More specifically, in step S619, the main control unit 201 instructs the information display unit 202 to display the FAX transmission screen 401 while designating the transmission settings 510 acquired in step S618 in such a way as to reflect the settings in a previous transmission. In step S620, the main control unit 201 accepts a user operation performed on the FAX transmission screen 401 and determines whether the transmission button has been pressed. If it is determined that the transmission button has been pressed to start the FAX transmission (Yes in step S620), the operation proceeds to step S621.

Then, in step S621, the main control unit 201 sets a transmitted image designated by the transmitted image information 508 as a transmission target and sets the settings designated on the FAX transmission screen 401 as transmission settings. The main control unit 201 instructs the FAX transmission unit 204 to transmit a FAX transmission instruction to the FAX driver 211 based on the above-mentioned setting information. If the cancel button is pressed to cancel the FAX transmission, main control unit 201 interrupts the processing illustrated in FIG. 6B.

The processing to be performed by the main control unit 201 in step S621 includes transmitting the FAX transmission instruction while designating the transmission job ID generated and managed by the client application 200 and storing the transmission job ID in association with transmitted FAX transmission history. The transmission job ID can be referred to in the generation of FAX transmission history about the retransmitted FAX document (see step S608). If the above-mentioned transmission job ID coincides with the transmission job ID 571 included in the FAX bibliographic information 570 of the retransmitted FAX document, the main control unit 201 associates the retransmitted FAX transmission history with the original transmission history.

More specifically, when the coincidence between the compared transmission job IDs is confirmed, the main control unit 201 associates the retransmitted FAX transmission history with the original FAX transmission history by setting the transmission history ID 502 of the FAX transmission history of the retransmission source with the original transmission history ID 503 of the retransmission.

Display Example of FAX Sending History

Figure 7:
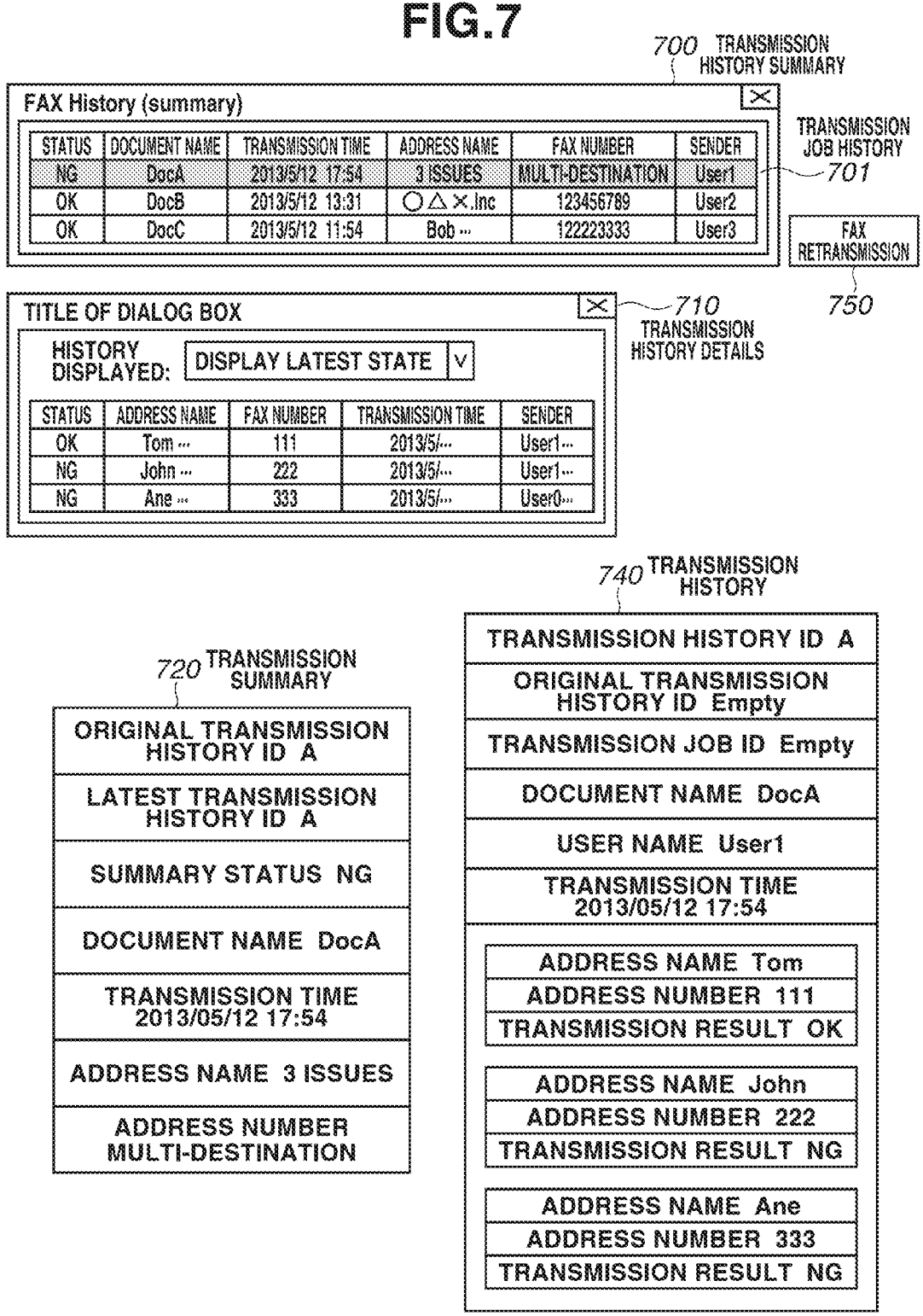
FIG. 7 illustrates an example of UI screens that can be displayed by a display unit.

FIG. 7 illustrates UI screens that can be displayed by a display unit 109 illustrated in FIGS. 1A and 1B. The examples illustrated in FIG. 7 are UI screens displaying FAX transmission history lists and related data contents. In FIG. 7, the transmission history summary 700 can be displayed when the option "display of transmission history" is executed on the context menu 308 illustrated in FIG. 3. A display of transmission job history 701 illustrated in FIG. 7 includes contents and status of FAX transmission in each transmission processing performed by a user. A multi-destination transmitted job can be displayed as one transmission job history.

Further, the displayed contents of the transmission history summary 700 illustrated in FIG. 7 include transmission status, document name, transmission time, address name, FAX number, and sender. The transmission job history 701 can be displayed based on transmission summary 720. The transmission summary 720 is an example of the FAX transmission history summary 550. For example, the status of the transmission history summary 700 can be displayed based on the summary status of the transmission summary 720. A transmission status "NG" in the status column can be displayed based on NG data indicating "transmission failure." The context menu 308, if it is executed, causes FAX retransmission processing to start using the transmission job history 701.

Transmission history details screen 710 is an example of the UI that displays transmission status and transmission contents for each address in the transmission job history 701. For example, the transmission history details screen 710 can be displayed when a transmission history details screen opening instruction is input in a state where one job is selected from the transmission history summary. The above-mentioned screen includes contents relating to latest transmission status and transmission contents for each address. The transmission history details screen 710 can be displayed based on transmission history 740. For example, in the transmission history details screen 710, the status of address name "Tom" is OK because a transmission result of the address name "Tom" is OK in the transmission history 740. The transmission result "OK" indicates that the transmission has been successfully done.

Cover Sheet Setting UI

FIG. 8 schematically illustrates a cover sheet setting UI of the client application 200. A cover sheet setting UI 801 can be displayed by the information display unit 202 when the cover sheet button 409 is pressed on the FAX transmission screen 401. The cover sheet setting UI 801 is UI that enables a user to set a cover sheet to be used in the FAX transmission. The FAX driver 211 can transmit a FAX document together with a cover sheet attached thereto based on cover sheet settings designated on the cover sheet setting UI 801. Hereinafter, the configuration of the cover sheet setting UI 801 is described in detail below.

A cover sheet attachment setting item 802 enables a user to select one of options displayable in an accompanied window. The options selectable in this case with respect to the presence of the cover sheet and an attachment method include "no attachment", "attachment of unique cover sheet for each address", and "attachment of same cover sheet for all addresses." A cover sheet selection setting item 803 enables a user to select one of options displayable in an accompanied window. The options selectable in this case are two or more templates dedicated for the cover sheet prepared beforehand.

A cover sheet subject setting item 804 enables a user to describe a subject to be described on the cover sheet in an accompanied window. A cover sheet comment setting item 805 enables a user to describe a comment to be attached to the cover sheet in an accompanied window. A sender setting item 806 enables a user to determine whether to describe a sender name on the cover sheet. The sender setting item 806 is accompanied with an input field in which the sender name can be described.

A transmission source FAX number setting item 807 enables a user to determine whether to describe a transmission source FAX number on the cover sheet. The transmission source FAX number setting item 807 is accompanied with an input field in which the transmission source FAX number can be described. An address name setting item 808 enables a user to determine whether to describe a transmission destination address name on the cover sheet. If the addition of the transmission destination address name is designated, an address name designated in the FAX transmission settings can be added to the cover sheet. A destination FAX number setting item 809 enables a user to determine whether to add a transmission destination FAX number to the cover sheet. If the addition of the transmission destination FAX number is designated, a destination FAX number designated in the FAX transmission settings can be added to the cover sheet.

A logo addition setting item 810 enables a user to determine whether to add a logo to the cover sheet. The logo addition setting item 810 is accompanied with a selection field in which an image file to be used for the logo can be designated. If the addition of the logo is designated, an image file designated in a cover sheet generation operation is read and a logo image can be added to the cover sheet. A signature addition setting item 811 enables a user to determine whether to add a signature to the cover sheet. The signature addition setting item 811 is accompanied with a selection field in which an image file to be used for the signature can be designated. If the addition of the signature is designated, an image file designated in the cover sheet generation operation is read and a signature image can be added to the cover sheet. An OK button 812 is operable to finalize cover sheet settings and reflect the finalized cover sheet settings to the FAX transmission settings. A cancel button 813 is operable to cancel the cover sheet settings.

Images Transmitted in Retransmission Operation

Figure 9C:
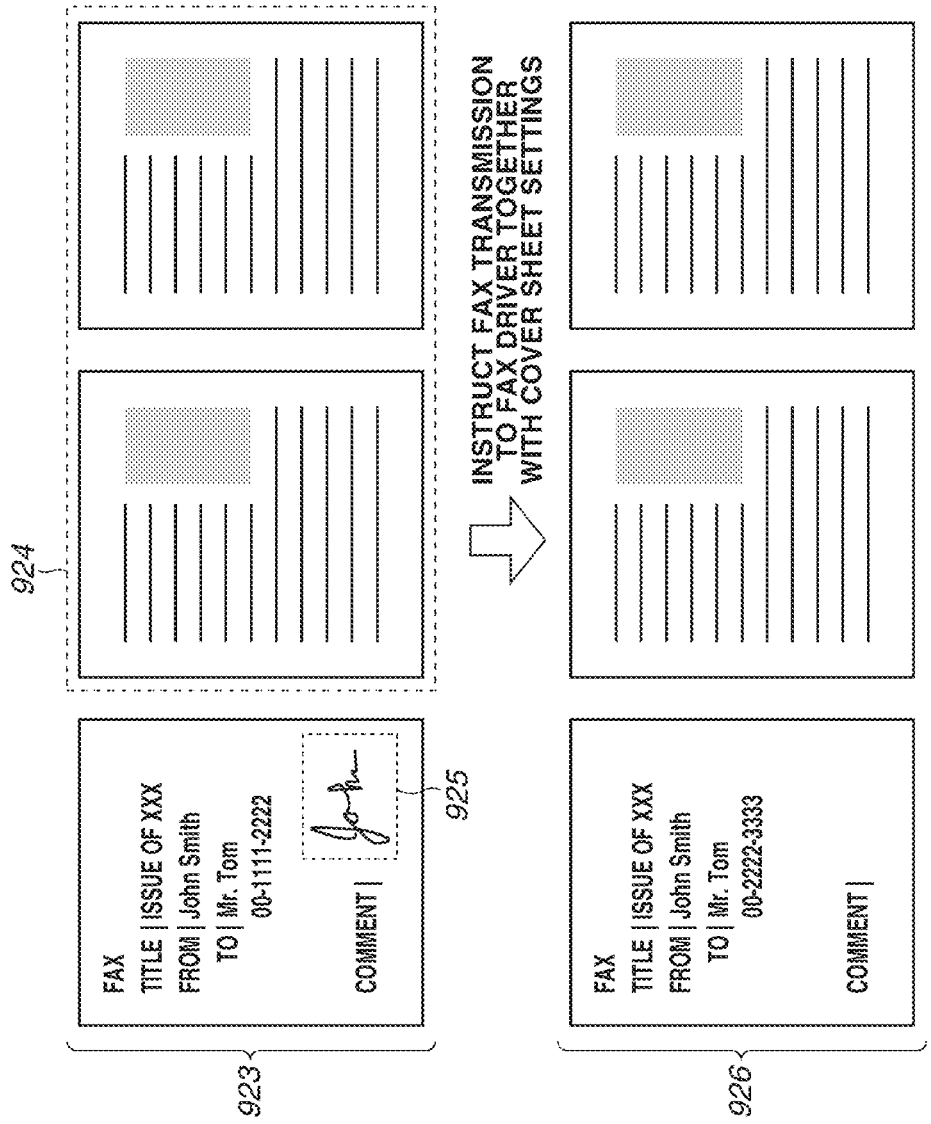
FIG. 9C illustrates FAX transmission processing that can be performed by the information processing apparatus.

FIGS. 9A to 9C schematically illustrate images transmitted to the image forming apparatus 111. The examples illustrated in FIGS. 9A to 9C are transmitted images included in FAX history that can be managed by the client application 200 illustrated in FIG. 2 and transmitted images that can be generated when the client application 200 instructs the FAX driver 211 in image retransmission operations. The transmitted image that the client application 200 manages as the FAX history, as illustrated in FIG. 5, indicates an image file identified by the transmitted image information 508 of the FAX transmission history 501.

FIG. 9A includes a transmitted image 900 that the client application 200 manages as the FAX history. The transmitted image 900 includes a cover sheet image 901 and a document image 902. The transmitted image 900 is an example of an image transmitted in a FAX transmission operation in a case where the cover sheet settings include a description about subject, sender, address name, and destination FAX number. A transmitted image 904 is an example of an image transmitted in a retransmission operation that can be generated by the FAX driver 211 in response to a retransmission instruction from the client application 200. In the illustrated example, there is not any change between the previous transmitted image 900 and the retransmitted image 904.

As a practical use case, the retransmitted image 904 can be used to retransmit a FAX history without changing any settings when the previous transmission has been unsuccessful for some reason. As mentioned above, when the previous transmission settings are used again in the retransmitting operation, the client application 200 designates an image 903 composed of the cover sheet image 901 and the document image 902 as a transmission target image and transmits a FAX transmission instruction to the FAX driver 211 without designating any cover sheet settings.

A transmitted image example 905 illustrated in FIG. 9A is an example of a FAX transmission image in a case where the cover sheet settings include a description about subject, sender, address name, and destination FAX number. A transmitted image 907 is an example of an image generated by the FAX driver 211 in response to a retransmission instruction from the client application 200 and retransmitted with cover sheet settings different from the settings in the previous transmission. The cover sheet settings used in the transmission of the image example 905 include addition of a new comment as entry information. As a practical use case, the image example 905 can be used to retransmit a FAX document by adding a confirmation and/or request comment when the other party returns no reply or retransmit a FAX document by correcting the entry information if there is a missed description in the entry information of the cover sheet.

As mentioned above, when the retransmission is performed with cover sheet settings different from the previous settings, the client application 200 transmits a document image 906 that does not include any cover sheet image and transmits a FAX transmission instruction to the FAX driver 211 while designating the cover sheet settings. Thus, the FAX driver 211 newly generates a cover sheet image 908 based on the designated cover sheet settings. The newly generated cover sheet image 908 illustrated in FIG. 9A indicates that a comment 909 is added based on the cover sheet settings designated by the client application 200.

A transmitted image example 910 illustrated in FIG. 9B is an example of a FAX transmission image in a case where the cover sheet settings include a description about subject, sender, address name, and destination FAX number. A transmitted image 912 is an example of an image generated by the FAX driver 211 in response to a retransmission instruction from the client application 200 and retransmitted with changed entry information although cover sheet settings are identical to those used in the previous transmission. The example illustrated in FIG. 9B indicates that the destination FAX number has been changed in the retransmission.

As a practical use case, the transmitted image 912 can be used to retransmit a FAX document by changing the FAX number when the wrong FAX transmission is performed due to erroneous setting of the destination FAX number. As mentioned above, when the retransmission is performed after changing the contents of the entry information of the cover sheet, the client application 200 transmits only a document image 911 that does not include any cover sheet image to the FAX driver 211. Further, the client application 200 transmits a FAX transmission instruction to the FAX driver 211 while designating cover sheet settings (i.e., a corrected FAX number in the example illustrated in FIG. 9B). Thus, the FAX driver 211 newly generates a cover sheet image 913 based on the cover sheet settings designated by the client application 200. The newly generated cover sheet image 913 illustrated in FIG. 9B includes a changed destination FAX number 914.

In FIG. 9B, a transmitted image 915 is an example of a transmitted image in a multi-destination FAX transmission to a plurality of addresses in a case where the cover sheet settings include a description about subject, sender, address name, and destination FAX number. Two transmitted images 918 and 921 are images generated by the FAX driver 211 in a retransmission operation in response to a retransmission instruction from the client application 200.

According to the above-mentioned example, a FAX document is retransmitted to a limited part of a plurality of addresses to which the image has been transmitted according to the multi-destination transmission method. In such a case, whether to transmit a cover sheet image updated based on the designated retransmission destinations or to transmit the cover sheet image used in the previous transmission is selectable dependent on user's intent. In this case, the client application 200 displays a confirmation screen (not illustrated) that requires the user to determine whether to transmit an updated cover sheet or transmit the previous cover sheet image.

As a practical use case, the above-mentioned confirmation screen can be used when a FAX document is retransmitted to a limited part of a plurality of addresses to which the FAX driver 211 has failed to transmit the image according to the multi-destination transmission method. Further, a plurality of persons may be allowed to commonly browse the same FAX history. In such a case, the above-mentioned confirmation screen can be used, for example, when an administrator (i.e., a sender who is different from that in the previous transmission) transmits a transmission failed FAX history.

When the user selection on the above-mentioned confirmation screen (not illustrated) indicates retransmission with an updated cover sheet, the client application 200 transmits only a document image 916 that does not include any cover sheet image to the FAX driver 211. Further, the client application 200 transmits a FAX transmission instruction to the FAX driver 211 while designating cover sheet settings.

In response to the FAX transmission instruction, the FAX driver 211 newly generates a cover sheet image 918. The newly generated cover sheet image 918 includes a description about the address name and the FAX number (see 919) that is limited for the reduced number of addresses. On the other hand, when the user selection indicates reuse of the cover sheet used in the previous transmission, the client application 200 transmits an image 917 that includes the cover sheet image and the document image to the FAX driver 211 and transmits a FAX transmission instruction to the FAX driver 211 without designating any cover sheet settings. Therefore, the FAX driver 211 transmits a cover sheet 922 having contents similar to those of the cover sheet used in the previous transmission.

In FIG. 9C, a transmitted image example 923 is an example of a FAX transmission image in a case where the cover sheet settings include a description about subject, sender, address name, destination FAX number, and signature. A transmitted image 926 is an example of a retransmitted image generated by the FAX driver 211 in response to a retransmission instruction from the client application 200. In the illustrated example, user-dependent information is included as entry information of the cover sheet. The client application 200 can read an image file stored in the information processing apparatus and add a signature image 925 to the cover sheet based on the signature addition setting item 811.

When other user retransmits FAX history in a situation that the settings include user-dependent data to be used as mentioned above, cover sheet information may be lost if the previously transmitted data cannot be prepared. In particular, when a cover sheet is newly generated in a retransmission operation, the cover sheet information may be lost.

Therefore, the client application 200 displays a notification screen (not illustrated), which informs that the cover sheet information described in the previous transmission cannot be partly generated, to confirm a user whether to continue or stop the transmission. If the user designation is stopping the transmission, the client application 200 interrupts the transmission processing. If the user designation is continuing the transmission, the client application 200 transmits a document image 924 that does not include any cover sheet image to the FAX driver 211. Further, the client application 200 sets the signature addition setting item 811 to OFF in the cover sheet settings and transmits a FAX transmission instruction to the FAX driver 211.

FAX Sending History Retransmission Flow

Figure 10:
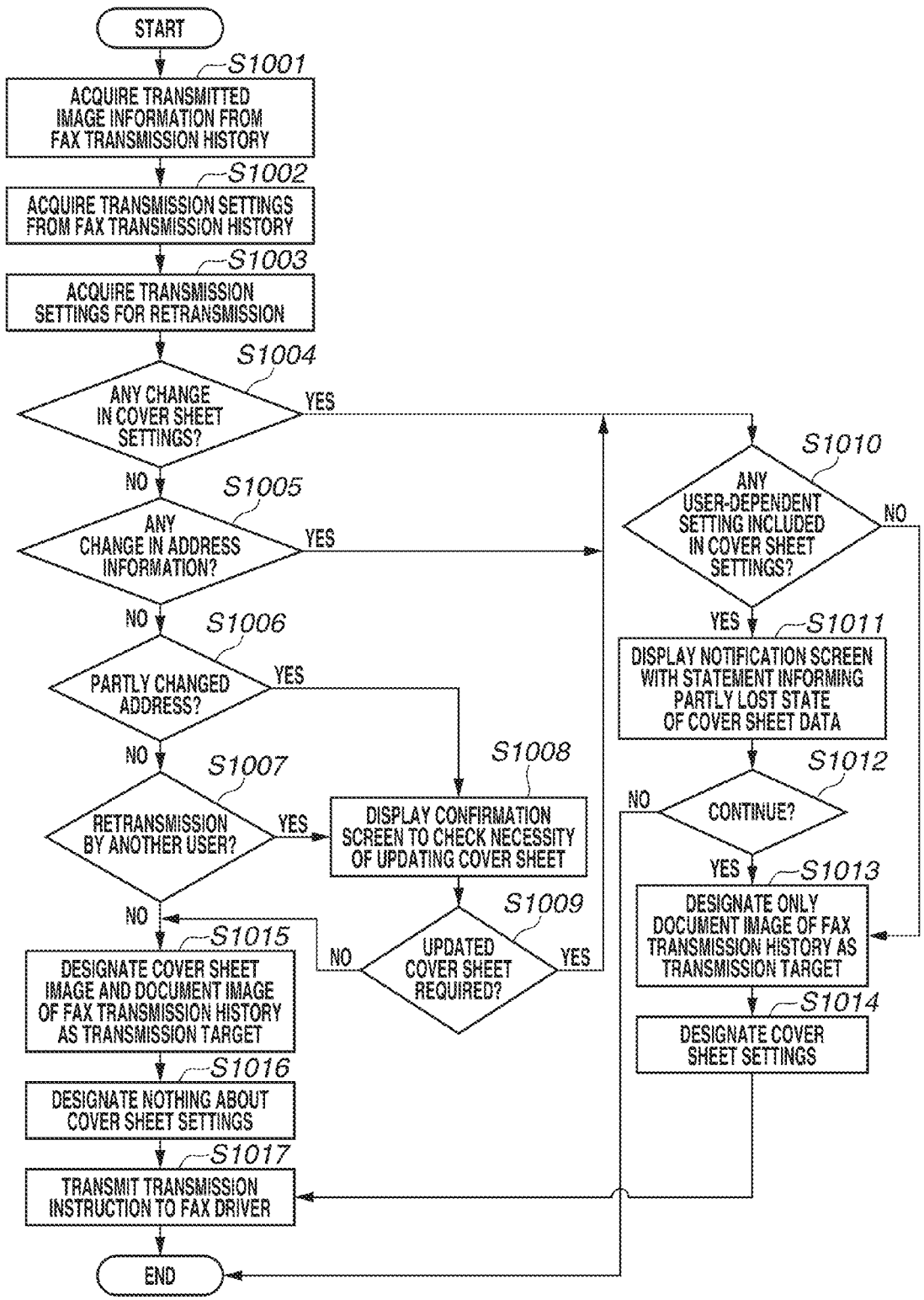
FIG. 10 is a flowchart illustrating a method for controlling the information processing apparatus.

FIG. 10 is a flowchart illustrating an information processing apparatus controlling method according to the present exemplary embodiment. The processing flow illustrated in FIG. 10 is an example of FAX transmission history retransmission processing that can be performed by the client application 200 of the information processing apparatus 101. The transmission processing to be performed by the client application 200 includes determining the necessity of updating the cover sheet image with reference to transmission settings in a previous FAX transmission and transmission settings in a retransmission operation and transmitting an updated cover sheet if updating the cover sheet is necessary or reusing the previous cover sheet if updating the cover sheet is unnecessary, as described below.

In this case, reusing the previous cover sheet because of the unnecessity of updating the cover sheet in the transmission processing is equivalent to invalidating cover setting information set for the retransmission and regenerating no new cover sheet. The retransmission of the FAX transmission history to be performed by the client application 200 can be started when a user selects a retransmission target transmission history from the transmission history summary 700 of the client application 200 and instructs FAX transmission when the FAX transmission screen 401 is displayed.

If a retransmission instruction is accepted from a user, then in step S1001, the main control unit 201 of the client application 200 refers to the transmitted image information 508 included in the FAX transmission history 501 currently selected on the transmission history summary 700 and sets a transmitted image in the FAX transmission history as a transmission target.

In step S1002, the main control unit 201 further refers to the transmission settings 510 included in the FAX transmission history 501. Further, in step S1003, the main control unit 201 instructs the information display unit 202 to acquire transmission settings being currently set on the FAX transmission screen 401. Next, in step S1004, the main control unit 201 compares the transmission settings included in the FAX transmission history acquired in step S1002 with the transmission settings being currently set (i.e., retransmission operation settings) acquired in step S1003 to check if there is any change in the cover sheet settings.

In the present exemplary embodiment, the cover sheet settings indicate settings that can be designated using the cover sheet setting UI 801 illustrated in FIG. 8. For example, the cover sheet settings include a setting item determining whether to describe an address name on the cover sheet or a setting item determining whether to attach a comment composed of a string of characters. If the main control unit 201 determines that there is a change in the cover sheet settings (Yes in step S1004), it is necessary to update the cover sheet. Therefore, the operation proceeds to step S1010. On the other hand, if the main control unit 201 determines that there is not any change in the cover sheet settings (NO in step S1004), then in step S1005, the main control unit 201 confirms whether there is any change in the information described on the cover sheet.

More specifically, in step S1005, the main control unit 201 determines whether there is any change in the address information by comparing the transmission settings included in the FAX transmission history with the address information included in retransmission transmission settings. More specifically, the main control unit 201 determines whether there is any change in the setting values relating to the address name and the destination FAX number. If there is any change in the address information (YES in step S1005), it is necessary to update the address information of the cover sheet. Therefore, the operation proceeds to step S1010.

If the main control unit 201 determines that there is not any change in the address information (No in step S1005), then in step S1006, the main control unit 201 determines whether the address is partly changed compared to the previous address. The processing to be performed in step S1006 is determining whether the number of addresses designated in a retransmission operation is reduced compared to the number of the plurality of addresses in the previous transmission performed according to the multi-destination transmission method. More specifically, the main control unit 201 compares an address list in the previous transmission with an address list in the retransmission operation.

If the main control unit 201 determines that the address is not partly changed (No in step S1006), then in step S1007, the main control unit 201 determines whether a resending user is identical to the user who has performed the previous transmission operation. More specifically, the main control unit 201 compares the user name 506 included in the FAX transmission history 501 with the present user name. If there is not any change in the user name (No in step S1007), it is unnecessary to update the cover sheet. Therefore, the operation proceeds to step S1015.

The determination with respect to whether to transmit an updated cover sheet or reuse the previous cover sheet depends on user's intent in a case where the determination result in step S1006 is Yes or the determination result in step S1007 is Yes. Therefore, if the determination result in step S1006 is Yes or the determination result in step S1007 is Yes, then in step S1008, the main control unit 201 displays a confirmation (inquiry) screen (not illustrated) to inquire the user about the necessity of transmitting an updated cover sheet or reusing the previous cover sheet.

If the main control unit 201 determines that the user selection indicates updating the cover sheet (Yes in step S1009), the operation proceeds to step S1010. Further, if the main control unit 201 determines that the user selection indicates using the previous cover sheet without any update (No in step S1009), the operation proceeds to step S1015. If the necessity of updating the cover sheet is confirmed or determined through the processing in step S1004, step S1005, and step S1009, then in step S1010, the main control unit 201 determines whether the cover sheet settings include any user-dependent setting. More specifically, if cover sheet setting information includes addition of stamp information, logo information, or signature information, the main control unit 201 determines that at least one user-dependent setting is included in the cover sheet settings. The above-mentioned cover sheet setting information may also be set by the FAX driver.

In the present exemplary embodiment, the logo addition setting item 810 and the signature addition setting item 811 included in the cover sheet setting UI 801 illustrated in FIG. 8 are examples of the user-dependent settings. With respect to the above-mentioned setting items, an image file is referred to in generating data to be added to the cover sheet in the FAX transmission. Therefore, it is unfeasible to refer to an image file stored in an information processing apparatus that belongs to other user. Accordingly, the client application 200 can select the determination result "Yes" in step S1010 if a designated path is present in the logo addition setting item 810 or the signature addition setting 811.

If the main control unit 201 determines that there is not any user-dependent setting (No in step S1010), the operation proceeds to step S1013. Further, if the main control unit 201 determines that there is a user-dependent setting (YES in step S1010), then in step S1011, the main control unit 201 displays a notification screen (not illustrated) together with a statement informing a partly lost state of the cover sheet entry information and cause the user to confirm whether to continue the print processing.

Then, in step S1012, the main control unit 201 acquires a result of a user selection on the notification screen (not illustrated) from the information display unit 202. If it is determined that the user instructs continuing the processing (Yes in step S1012), the operation proceeds to step S1013. If the main control unit 201 determines that the continuation of the processing is not required (No in step S1012), the main control unit 201 terminates the processing of the flowchart illustrated in FIG. 10. In step S1013, the main control unit 201 designates only a document image that excludes the cover sheet image of the transmitted image included in the FAX transmission history acquired in step S1001, as a transmission target.

In step S1014, the main control unit 201 reflects the cover sheet settings to the transmission settings. Then in step S1017, the main control unit 201 instructs the FAX transmission unit 204 to transmit a FAX transmission instruction to the FAX driver 211. Through the above-mentioned processing, a document image (text data) of the transmitted image included in the FAX transmission history and the setting for adding a newly generated cover sheet can be transmitted to the FAX driver 211. In response to the FAX transmission, the FAX driver 211 newly generates a cover sheet for the FAX transmission.

If it is determined that updating the cover sheet is unnecessary through the sequential determinations in steps S1004 to S1007, then in step S1015, the main control unit 201 designates the cover sheet image and the document image included in the transmitted image of the FAX transmission history acquired in step S1001 as a transmission target. Further, in step S1016, the main control unit 201 designates nothing about the cover sheet settings. Subsequently, in step S1017, the main control unit 201 transmits a FAX transmission instruction to the FAX driver 211. When the client application 200 performs sequential processing in steps S1015 to S1017, the client application 200 uses the cover sheet image and the document image included in the transmitted image of the FAX transmission history and transmits the FAX transmission instruction to the FAX driver 211 without designating any cover sheet settings. As a result, the FAX driver 211 transmits a FAX document without generating any cover sheet.

As mentioned above, the processing to be performed in the present exemplary embodiment includes determining the necessity of updating a cover sheet image with reference to previous transmission settings and retransmission operation settings, updating the cover sheet if necessary, and performing retransmission after completing the confirmation by the user in a case where the necessity of updating the cover sheet is variable depending on user's intent. Therefore, it is unnecessary for each user to check the necessity of updating the cover sheet. The FAX retransmission can be easily performed.

In a second exemplary embodiment, constituent components similar to those described in the first exemplary embodiment are denoted by the same reference numerals and redundant description thereof will be avoided appropriately. All of the description relating to FIGS. 1 to 10, except for FIGS. 3 and 7, described in the first exemplary embodiment can be equally applied to the present exemplary embodiment. Although the simplified display of the FAX transmission history employed in the first exemplary embodiment is the transmission history summary 700, it is also useful to perform a comparable display using the main UI 301 of the client application 200.

For example, the preview 305 of the main UI 301 is usable to perform a preview of the transmitted image of the FAX transmission history and the file property 306 is usable to display details of the FAX transmission history. The user friendliness will improve greatly.

Software Configuration (Client Application)

Figure 11:
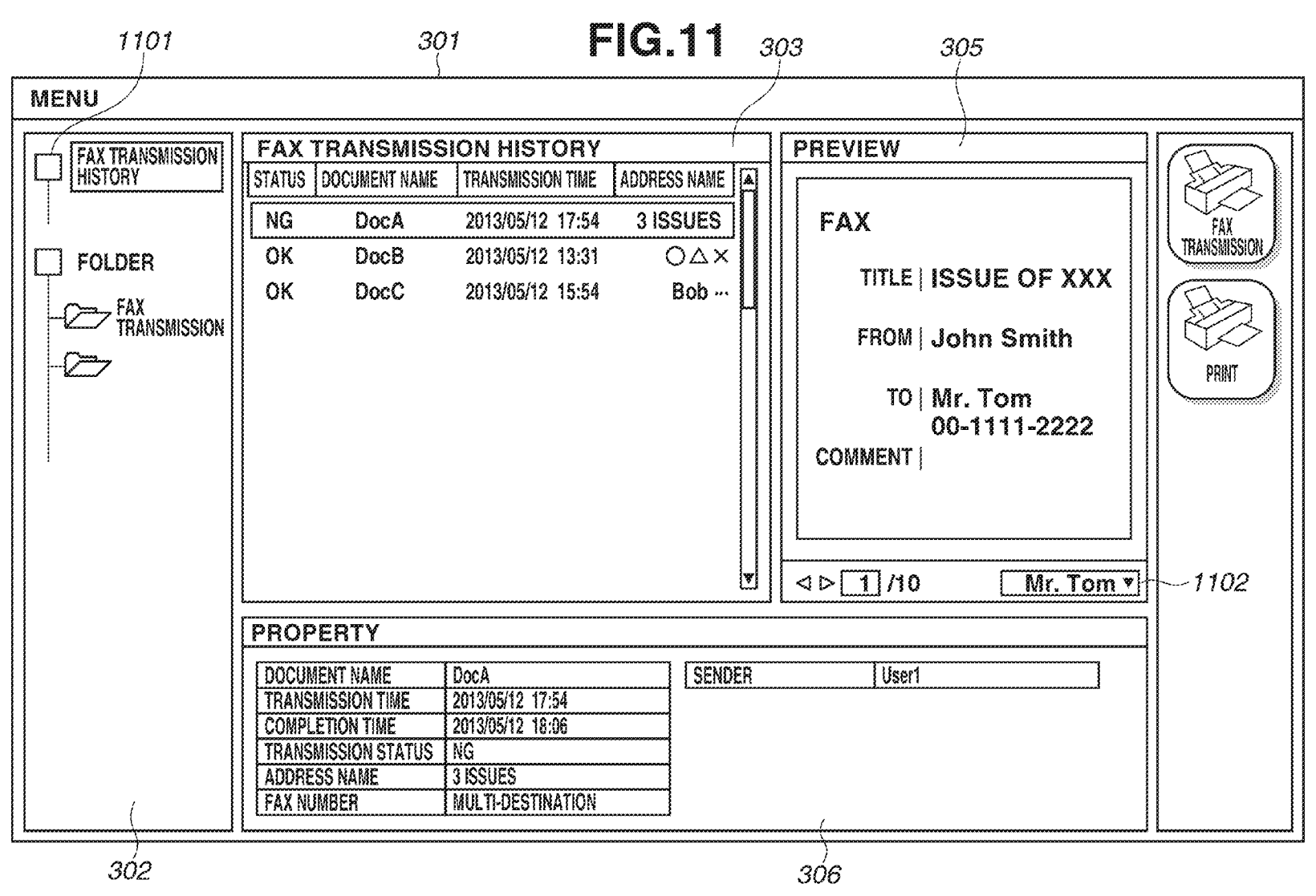

FIG. 11 illustrates an example of the UI screen that can be displayed by the information processing apparatus according to the present exemplary embodiment. The example illustrated in FIG. 11 is a UI screen example of the client application 200. Similar to the main UI 301 of the client application illustrated in FIG. 3, a main UI 301 illustrated in FIG. 11 includes a folder tree view 302 that indicates a folder hierarchical structure of files to be managed and a file view 303 that displays a file in the folder. Further, the main UI 301 includes a preview 305 in which a preview of the currently selected file 304 can be displayed. The main UI 301 includes a file property 306 in which detailed information about the currently selected file 304 can be displayed. The main UI 301 of the client application 200 according to the present exemplary embodiment is configured to display FAX transmission history.

In FIG. 11, the folder tree view 302 includes a FAX transmission history 1101 indicating a tree relating to the FAX transmission history. When a user selects the displayed item 1101, details of the FAX transmission history can be displayed in the file view 303. The FAX transmission history contents to be displayed in the file view 303 are similar to those of the transmission history summary 700 illustrated in FIG. 7. A transmitted image of the FAX transmission history selected in the file view 303 can be displayed in the preview 305. The transmitted image in the preview 305 can be displayed with reference to the transmitted image information 508 included in the FAX transmission history 501.

An address selection 1102 attached to the preview 305 enables the user to select an address to be preview displayed in a case where there is a plurality of transmission addresses. The user can select one of addresses through the address selection 1102 from an address list of the FAX transmission history selected in the file view 303. A transmitted image corresponding to the address selected through the address selection 1102 can be displayed in the preview 305. Detailed information about the FAX transmission history selected in the file view 303 can be displayed in the file property 306. For example, the displayable information includes document name, transmission time, completion time, transmission status, address name, destination FAX number, and sender.

Transmission Image Preview Flow

FIG. 12 is a flowchart illustrating a method for controlling the information processing apparatus according to the present exemplary embodiment. The example processing illustrated in FIG. 12 is processing for previewing a transmitted image of FAX transmission history, which can be performed by the client application 200 of the information processing apparatus 101. The client application 200 can display a preview of a transmitted image of an address selected through the address selection 1102, in the preview 305 of the main UI 301, as described below.

Further, in the present exemplary embodiment, an image file of a transmitted image includes a cover sheet image and a document image corresponding to each transmission address. The preview display processing includes extracting a cover sheet image of a target address from a plurality of cover sheet images and displaying the extracted cover sheet image in combination with a related document image. The preview display processing further includes displaying, in the preview 305, a transmitted image of FAX transmission history selected in the file view 303. The client application 200 starts the preview display processing when a user selects an address through the address selection 1102 of the preview 305.

If an address is selected by a user, then in step S1201, the main control unit 201 acquires address information about the address selected through the address selection 1102 from the information display unit 202. The address information includes address name and FAX number of the destination. Next, in step S1202, the main control unit 201 acquires the transmitted image information 508 included in the FAX transmission history 501 via the storage unit 203. The main control unit 201 acquires a page number corresponding to a cover sheet image of the selected address, from the transmitted image. The transmitted image information 508 of the FAX transmission history 501 includes the page number of the cover sheet, which indicates a cover sheet image included in the transmitted image. The page number of the cover sheet is managed in association with the address name and the FAX number.

In step S1203, the main control unit 201 acquires a cover sheet page number of the selected address by searching for cover sheet page information in the transmitted image information 508 with reference to the address name and the FAX number acquired in step S1201. In step S1204, the main control unit 201 transmits an instruction to the information display unit 202 while designating the page number acquired in step S1203 and page numbers of document images (page numbers following the cover sheet page). In response to the instruction, the information display 202 displays images of the designated page numbers, referring to a transmitted image file of the transmitted image information 508 of the FAX transmission history 501.

As mentioned above, when the main UI 301 of the client application 200 is used to perform a preview of a transmitted image of FAX transmission history and display detailed information about the transmitted image, the user friendliness improves greatly in the management of the FAX transmission history. The present invention is not limited to the FAX transmission described in the above-mentioned exemplary embodiments and can be similarly applied to a reprint operation or a mail retransmission operation.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-221948 filed Oct. 25, 2013, which is hereby incorporated by reference herein in its entirety.

What is claimed is:

1. An information processing apparatus, comprising:
   a transmission unit configured to transmit cover data and document data to a designated transmission destination;
   a storage unit configured to store historical data including the cover data and the document data transmitted by the transmission unit;
   a setting unit configured to set cover setting information for retransmitting the historical data including the cover data and the document data;
   a determination unit configured to determine whether the cover data included in the historical data is usable based on the historical data and the cover setting information having been set for the retransmission; and
   an instruction unit configured to invalidate the cover setting information having been set by the setting unit for the retransmission if it is determined that the cover data included in the historical data is usable and instruct retransmitting the historical data.

2. The information processing apparatus according to claim 1, further comprising:
   a generation unit configured to generate new cover data based on the cover setting information having been set for the retransmission if it is determined that the cover data included in the historical data is unavailable,
   wherein the transmission unit is configured to transmit the new cover data generated by the generation unit and the document data of the historical data to the designated transmission destination, instead of transmitting the cover data of the historical data.

3. The information processing apparatus according to claim 1, wherein if a retransmission instruction is received to perform retransmission processing, the document data of the historical data is transmitted.

4. The information processing apparatus according to claim 1, further comprising:
   a notification unit configured to notify the necessity of newly creating cover data if it is determined that the cover data included in the historical data is unavailable.

5. The information processing apparatus according to claim 1, further comprising:
   an identification unit configured to determine whether user-dependent information is present in the cover data included in the historical data; and a display unit configured to display information indicating a partly lost state of cover data entry information if it is determined that the user-dependent information is present in the cover data included in the historical data.

6. The information processing apparatus according to claim 5, wherein the user-dependent information includes user-dependent stamp information and logo information.

7. A method for controlling an information processing apparatus, comprising:

transmitting cover data and document data to a designated transmission destination;

storing historical data including the cover data and the document data having been transmitted by a transmission unit, in a storage unit;

setting cover setting information for retransmitting the historical data including the cover data and the document data;

determining whether the cover data included in the historical data is usable based on the historical data and the cover setting information having been set for the retransmission; and invalidating the cover setting information having been set for the retransmission if it is determined that the cover data included in the historical data is usable and instructing retransmitting the historical data.

8. A non-transitory computer-readable storage medium that stores programs for causing a computer to function as:

a transmission unit configured to transmit cover data and document data to a designated transmission destination;

a storage unit configured to store historical data including the cover data and the document data transmitted by the transmission unit;

a setting unit configured to set cover setting information for retransmitting the historical data including the cover data and the document data;

a determination unit configured to determine whether the cover data included in the historical data is usable based on the historical data and the cover setting information having been set for the retransmission; and an instruction unit configured to invalidate the cover setting information having been set by the setting unit for the retransmission if it is determined that the cover data included in the historical data is usable and instruct retransmitting the historical data.

* * * * *